US010619557B2

(12) United States Patent
Suzuki et al.

(10) Patent No.: US 10,619,557 B2
(45) Date of Patent: Apr. 14, 2020

(54) GAP MEMBER AND INTERNAL COMBUSTION ENGINE

(71) Applicant: MITSUBISHI HEAVY INDUSTRIES ENGINE & TURBOCHARGER, LTD., Sagamihara-shi, Kanagawa (JP)

(72) Inventors: Hajime Suzuki, Tokyo (JP); Hiroshi Yoshizumi, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 15/769,152

(22) PCT Filed: Oct. 20, 2016

(86) PCT No.: PCT/JP2016/081111
§ 371 (c)(1),
(2) Date: Apr. 18, 2018

(87) PCT Pub. No.: WO2017/069198
PCT Pub. Date: Apr. 27, 2017

(65) Prior Publication Data
US 2018/0306099 A1 Oct. 25, 2018

(30) Foreign Application Priority Data
Oct. 22, 2015 (JP) .................. 2015-207874

(51) Int. Cl.
*F02F 11/00* (2006.01)
*F02B 23/00* (2006.01)

(52) U.S. Cl.
CPC .............. *F02B 23/00* (2013.01); *F02F 11/00* (2013.01); *F02F 11/002* (2013.01); *F02F 11/005* (2013.01); *Y02T 10/125* (2013.01)

(58) Field of Classification Search
CPC ........ F02F 11/00; F02F 11/002; F02F 11/005; F02F 23/00
See application file for complete search history.

(56) References Cited

U.S. PATENT DOCUMENTS 2,939,753 A 6/1960 Schilling et al.
3,853,099 A * 12/1974 Feather ..................... F02F 1/16
123/193.3

(Continued)

FOREIGN PATENT DOCUMENTS

DE 2 227 042 A1 12/1973
EP 1 326 022 A1 7/2003

(Continued)

OTHER PUBLICATIONS

International Search Report dated Dec. 20, 2016 in corresponding PCT Application No. PCT/JP2016/081111 with English Translation.

(Continued)

*Primary Examiner* — Jacob M Amick
(74) *Attorney, Agent, or Firm* — Birch, Stewart, Kolasch & Birch, LLP

(57) ABSTRACT

An engine includes a cylinder liner, a cylinder block, a cylinder head, a seal portion, and a gap member. The seal part is provided to surround the outer circumferential side of the cylinder liner and configured to seal between the cylinder block and the cylinder head. At a position on the inner circumferential side of the seal part, the gap member fills the gap between the cylinder head and the end surface of the inner peripheral side of the cylinder liner, and is made of a material having a lower Young's modulus than the seal part.

3 Claims, 4 Drawing Sheets

(56) References Cited

U.S. PATENT DOCUMENTS

| | | | | |
|---|---|---|---|---|
| 4,300,273 | A | * | 11/1981 | Lockhart .............. B23P 15/00 |
| | | | | 156/264 |
| 4,305,348 | A | * | 12/1981 | Martin ................ F16J 15/022 |
| | | | | 123/41.72 |
| 4,548,165 | A | * | 10/1985 | Vorobiev ............. F02F 11/002 |
| | | | | 123/41.84 |
| 2005/0023770 | A1 | | 2/2005 | Swensen et al. |
| 2013/0032117 | A1 | * | 2/2013 | Worthington ......... F02F 1/004 |
| | | | | 123/193.2 |
| 2015/0144089 | A1 | | 5/2015 | Schiliro et al. |
| 2017/0226958 | A1 | * | 8/2017 | Cline .................... F02F 1/004 |

FOREIGN PATENT DOCUMENTS

| | | |
|---|---|---|
| FR | 1360266 A | 5/1964 |
| GB | 1124160 A | 8/1968 |
| GB | 1166370 A | 10/1969 |
| GB | 1261137 A | 1/1972 |
| JP | 54-167204 U | 11/1979 |
| JP | 56-113145 U | 9/1981 |
| JP | 60-67751 A | 4/1985 |
| JP | 62-152056 U | 9/1987 |
| JP | 63-71456 U | 5/1988 |
| JP | 8-26812 B | 3/1996 |
| JP | 2532397 Y | 4/1997 |
| JP | 2671407 B | 10/1997 |
| JP | 2000-130586 A | 5/2000 |
| JP | 2001-193560 A | 7/2001 |
| JP | 2001-280504 A | 10/2001 |
| JP | 2005-54992 A | 3/2005 |
| JP | 2010-150983 A | 7/2010 |
| JP | 2010-276078 A | 12/2010 |
| KR | 10-0537155 B | 12/2005 |

OTHER PUBLICATIONS

Written Opinion dated Dec. 20, 2016 in corresponding PCT Application No. PCT/JP2016/081111 with English Translation.

* cited by examiner

US 10,619,557 B2

GAP MEMBER AND INTERNAL COMBUSTION ENGINE

TECHNICAL FIELD

The present invention relates to a gap member and an internal combustion engine.

Priority is claimed on Japanese Patent Application No. 2015-207874, filed Oct. 22, 2015, the content of which is incorporated herein by reference.

BACKGROUND ART

Gas engines which are operated by burning gaseous fuels (fuel gases) such as natural gas and city gas are known. Theses gas engines can obtain high efficiency and high output. Therefore, gas engines are widely used mainly for power generation engines for regular and emergency use, engines for construction machines, engines mounted on ships, vehicles, and so on.

Patent Document 1 describes a premixed combustion type auxiliary chamber gas engine. In the gas engine disclosed in Patent Document 1, when a piston approaches a compression top dead center in a main combustion chamber and fuel gas in the main combustion chamber is compressed, the fuel gas supplied into an auxiliary chamber is ignited by a spark of a spark plug provided in the auxiliary chamber. Therefore, a flame is generated from the auxiliary chamber, and this flame is injected from a mouthpiece provided in the auxiliary chamber into the main combustion chamber. Then, a mixed gas in the main combustion chamber is ignited by this flame.

A gas engine generally includes a cylinder block (crankcase) and a cylinder head. The cylinder block has a hole which opens toward the cylinder head and accommodates a piston. A cylindrical cylinder liner which fat us a sliding surface for the piston is installed inside this hole. The cylinder head is fastened to the cylinder block by a bolt or the like and occludes an opening of the cylinder block at that time. A space surrounded by the cylinder head, the cylinder liner and the piston serves as a main combustion chamber to which mixed gas is supplied.

A seal member such as a gasket for sealing the main combustion chamber is provided between the cylinder block and the cylinder head. Generally, the seal member is sandwiched between the cylinder block on an outer circumferential side of the cylinder liner or the cylinder liner and the cylinder head. The seal member is sandwiched between the cylinder head and the cylinder block and pressed by an axial force of the bolt fastening the cylinder head and the cylinder block and exerts high sealing performance.

CITATION LIST

Patent Document

Patent Document 1: Japanese Unexamined Patent Application, First Publication No. 2010-150983

SUMMARY OF INVENTION

Technical Problem

In the above-described internal combustion engine, the cylinder head and the cylinder liner are formed in such a manner that they do not come into direct contact with each other particularly at a position on an inner circumferential side of the seal member to properly sandwich the seal member therebetween. Therefore, a slight gap (clearance) is formed between the cylinder head and the cylinder liner.

Particularly, in the case of the premixed combustion type, some of the mixed gas supplied to the combustion chamber may enter the gap between the cylinder head and the cylinder liner. In the case in which some of the mixed gas enters the gap between the cylinder head and the cylinder liner, when the mixed gas in the main combustion chamber ignites, the flame does not reach the mixed gas that has entered the gap between the cylinder head and the cylinder liner, and thus the mixed gas that has entered the gap between the cylinder head and the cylinder liner may be in an unburned state.

Further, lubricating oil for lubricating an inner wall surface of the cylinder liner may enter the gap. The lubricating oil that has entered this gap may burn with the mixed gas and may cause abnormal combustion.

That is, in the above-described engine, there is a problem in that it is difficult to further improve fuel economy and to achieve low emission due to the presence of the unburned mixed gas or the combustion of the lubricating oil.

Furthermore, in the above-described engine, when attempting to dispose the seal member on an inner circumferential side of the cylinder liner so that no gap is formed between the cylinder head and the cylinder liner, the axial force of the bolt may act on the inner circumferential side of the cylinder liner, and thus the cylinder liner may be damaged.

It is an object of the present invention to provide a gap member and an internal combustion engine capable of further improving fuel economy, achieving low emission and suppressing breakage of a cylinder liner.

Solution to Problem

According to a first aspect of the present invention, a gap member is used in an internal combustion engine including a cylinder liner, a cylinder body, a cylinder head, and a seal portion. The cylinder liner is formed in a cylindrical shape in which a piston reciprocates. The cylinder liner is fitted on the cylinder body. The cylinder head is provided to face the cylinder body and closes an opening of the cylinder liner. The seal portion is provided to surround an outer circumferential side of the opening and seals between the cylinder head and at least one of the cylinder body and the cylinder liner. The gap member is disposed in a gap between the cylinder head and the cylinder liner on an inner circumferential side of the seal portion and is formed of a material with a lower Young's modulus than the seal portion.

Since the gap member is disposed in the gap between the cylinder head and the cylinder liner on the inner circumferential side of the seal portion, it is possible to suppress a fuel from entering this gap. Therefore, it is possible to suppress the fuel that has entered the gap from remaining without being burned during fuel combustion in the internal combustion engine and to suppress the lubricating oil from entering the gap and inducing abnormal combustion.

Further, the gap member has a lower Young's modulus than the seal portion. Therefore, when a pressing force is applied by fastening the cylinder body and the cylinder head with a bolt or the like, a repulsive force generated at the seal portion is larger than a repulsive force generated by the gap member being fitted therebetween. Thus, a fastening force for fastening the cylinder body and the cylinder head can act mainly through the seal portion rather than through the gap member. Accordingly, it is possible to prevent a shearing force from acting on the cylinder liner by the fastening force and to reduce breakage of the cylinder liner.

According to a second aspect of the present invention, the gap member of the first aspect may be formed so that, in the internal combustion engine, a mixed gas in which fuel and air are mixed is supplied to a combustion chamber defined by being surrounded by the cylinder liner, the cylinder head, and the piston.

In an internal combustion engine such as a gas engine in which a mixed gas in which fuel and air are mixed in advance is supplied to a combustion chamber, the mixed gas easily enters the gap between the cylinder head and the cylinder liner. In such a constitution, the entering of the mixed gas into the gap can be suppressed by disposing the gap member in the gap.

According to a third aspect of the present invention, the gap member of the first or second aspect may be formed in a shape corresponding to the gap between the cylinder head and the cylinder liner.

Due to such a constitution, it is only necessary to sandwich the preliminarily formed gap member between the cylinder head and the cylinder liner, and thus assembly efficiency of the internal combustion engine can be improved.

According to a fourth aspect of the present invention, an internal combustion engine includes a cylinder liner, a cylinder body, a cylinder head, and a seal portion. The cylinder liner is formed so that a piston reciprocates. The cylinder liner is fitted on the cylinder body. The cylinder head is provided to face the cylinder body and closes an opening of the cylinder liner. The seal portion is provided to surround an outer circumferential side of the opening and seals between the cylinder head and at least one of the cylinder body and the cylinder liner. A gap member according to any one of the first to third aspects is disposed in a gap between the cylinder head and the cylinder liner on an inner circumferential side of the seal portion.

Due to such a constitution, when the gap member is sandwiched between the cylinder head and the cylinder liner to fasten the cylinder head and the cylinder block, a fastening force for fastening the cylinder body and the cylinder head can act mainly through the seal portion rather than through the gap member. Therefore, it is possible to suppress a shearing force from acting on the cylinder liner by the fastening force and to reduce breakage of the cylinder liner. Accordingly, improvement in the fuel economy and the low emission in the internal combustion engine can be realized Advantageous Effects of Invention According to the above-described gap member and internal combustion engine, it is possible to further improve fuel economy, to achieve low emission, and to suppress breakage of a cylinder liner.

DESCRIPTION OF EMBODIMENTS

Hereinafter, a gap member and an internal combustion engine according to the embodiment of the present invention will be described with reference to the drawings.

First Embodiment

Figure 1:
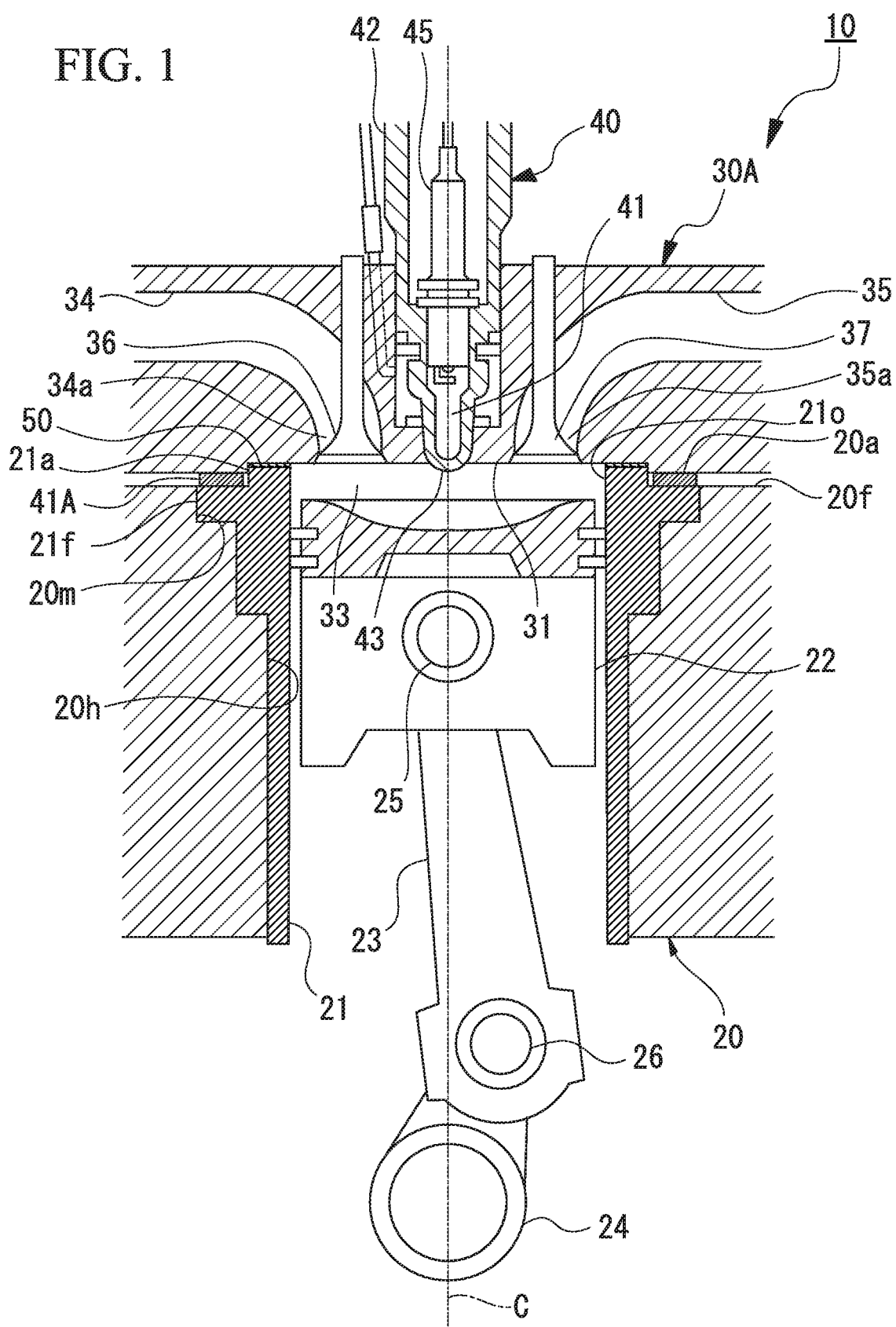
FIG. 1 is a cross-sectional view showing a constitution around a cylinder head of an internal combustion engine according to a first embodiment of the present invention.

FIG. 1 is a cross-sectional view taken along a center axis of a cylinder and showing a constitution around a cylinder head of a gas engine according to an embodiment of the present invention.

As shown in FIG. 1, an engine (internal combustion engine) 10 includes at least a cylinder block (cylinder body) 20, a cylinder head 30A, and an auxiliary chamber member 40. The engine 10 in the embodiment is a gas engine which is operated by combusting a gaseous fuel (fuel gas) such as natural gas or city gas. The engine 10 in the embodiment is a stationary auxiliary chamber type gas engine used for power generation equipment and so on.

A hole 20$h$ which opens in a head surface 20$f$ facing the cylinder head 30A is formed in a cylinder block 20. A cylindrical cylinder liner 21 is disposed inside the hole 20$h$.

The cylinder liner 21 is integrally formed with a flange portion 21$f$. The flange portion 21$f$ is formed at one end 21$a$ close to the cylinder head 30A. The flange portion 21$f$ is also forming so that a diameter thereof increases toward an outer circumferential side around a center axis C of the cylinder liner 21 (hereinafter, simply referred to as an outer circumferential side). The cylinder block 20 has an accommodating groove 20$m$ at an opening edge of the hole 20$h$. The accommodating groove 20$m$ is formed in an annular shape to accommodate the flange portion 21$f$ of the cylinder liner 21. The cylinder liner 21 is positioned with respect to the cylinder block 20 by accommodating the flange portion 21$f$ in the accommodating groove 20$m$ of the cylinder block 20.

The cylinder liner 21 accommodates a piston 22 therein. The piston 22 is formed to be linearly reciprocable in a direction in which the center axis C of the cylinder liner 21 extends (hereinafter, referred to as a "cylinder axial direction") while being guided by the cylinder liner 21. The piston 22 is connected to a crankshaft 24 accommodated in a crankcase (not shown) via a connecting rod 23.

The connecting rod 23 is rotatably connected to the piston 22 via a pin 25. The connecting rod 23 is further rotatably connected to the crankshaft 24 via a pin 26. Accordingly, when the piston 22 linearly moves in the cylinder axial direction within the cylinder liner 21, a linear motion of the piston 22 is transmitted to the crankshaft 24 by the connecting rod 23 and converted into a rotational motion of the crankshaft 24.

The cylinder head 30A is fastened to a head surface 20$f$ of the cylinder block 20 by a bolt (not shown) or the like. Therefore, the cylinder head 30A closes an opening 210 of the one end 21$a$ of the cylinder liner 21. A roof surface 31 having a flat shape, a hemispherical shape, or a curved surface shape orthogonal to the center axis C of the cylinder liner 21 is formed on a surface of the cylinder head 30A which faces the cylinder block 20 side. The roof surface 31 is formed in a region facing the cylinder liner 21.

A main combustion chamber (combustion chamber) 33 is defined by the above-described cylinder liner 21, the roof surface 31 of the cylinder head 30A, and the piston 22.

An intake port 34 and an exhaust port 35 are formed in the cylinder head 30A. The intake port 34 and the exhaust port 35 are formed at intervals in a circumferential direction around the center axis C of the cylinder liner 21. End portions 34*a* and 35*a* of the intake port 34 and the exhaust port 35 on the main combustion chamber 33 open to the roof surface 31 and face the main combustion chamber 33.

The intake port 34 communicates with a mixed gas supply source (not shown). By this mixed gas supply source, a premixed gas in which air is premixed with a combustion gas can be supplied to the intake port 34.

In the intake port 34, an intake valve 36 is provided at an end 34*a* on a side close to the main combustion chamber 33. The intake valve 36 can be displaced from a closed position to an open position by a valve drive mechanism (not shown). The mixed gas supplied from the mixed gas supply source is supplied from the intake port 34 to the main combustion chamber 33 by displacing the intake valve 36 from the closed position to the open position.

The exhaust port 35 is connected to an exhaust gas flow path (not shown). In the exhaust port 35, an exhaust valve 37 is provided at the end portion 35*a* close to the main combustion chamber 33. By displacing the exhaust valve 37 from the closed position to the open position by the valve drive mechanism (not shown), an exhaust gas burned in the main combustion chamber 33 flows from the main combustion chamber 33 through the exhaust port 35 and the exhaust gas flow path and is discharged to the outside.

The auxiliary chamber member 40 includes an auxiliary chamber holder 42 and an auxiliary chamber mouthpiece 43.

The auxiliary chamber holder 42 is provided inside the cylinder head 30A. A center axis of the auxiliary chamber holder 42 is provided on an extension line of the center axis C of the cylinder liner 21.

The auxiliary chamber mouthpiece 43 is provided to protrude from a center of the roof surface 31 of the cylinder head 30A into the main combustion chamber 33. The auxiliary chamber mouthpiece 43 is formed in a hollow shape, and an internal space thereof is an auxiliary chamber 41. A fuel gas is supplied to the auxiliary chamber 41 from the outside.

A spark plug 45 is provided in the auxiliary chamber holder 42. The fuel gas supplied from the outside into the auxiliary chamber 41 is ignited and burned to generate a flame by generating a spark from the spark plug 45. The flame generated by this ignition is injected into the main combustion chamber 33 from the auxiliary chamber mouthpiece 43. The mixed gas supplied into the main combustion chamber 33 through the intake port 34 (refer to FIG. 1) is ignited and burned by this flame. Then, in the cylinder liner 21, the piston 22 linearly reciprocates in the cylinder axial direction of the cylinder liner 21, and the engine 10 is driven.

Next, a sealing structure between the cylinder block 20 and the cylinder head 30A will be described.

Figure 2:
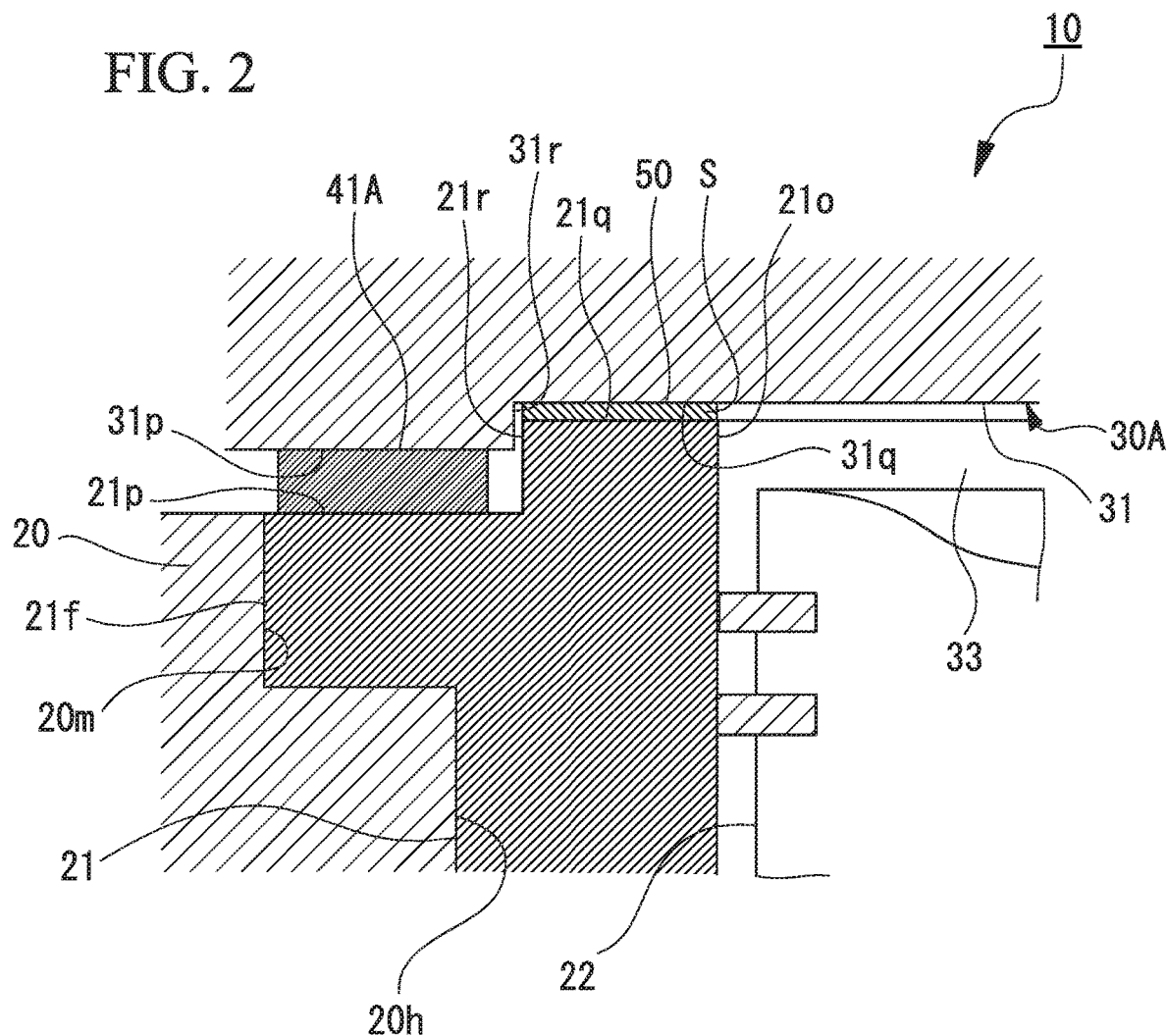
FIG. 2 is an enlarged cross-sectional view showing a joining structure of a cylinder block and a cylinder head of the internal combustion engine.

FIG. 2 is an enlarged cross-sectional view showing a joining structure of the cylinder block and the cylinder head of the internal combustion engine.

As shown in FIG. 2, the cylinder liner 21 has an outer circumferential side end surface 21*p* and an inner circumferential side end surface 21*q*. The outer circumferential side end surface 21*p* and the inner circumferential side end surface 21*q* face the cylinder head 30A in the cylinder axial direction. The outer circumferential side end surface 21*p* and the inner circumferential side end surface 21*q* are formed to be orthogonal to the center axis C of the cylinder liner 21.

The outer circumferential side end surface 21*p* is provided on an outer circumferential side of the cylinder liner 21, that is, at a position far from the center axis C. In other words, the outer circumferential side end surface 21*p* is formed to include at least a surface of the flange portion 21*f* facing the cylinder head 30A side. The inner circumferential side end surface 21*q* is provided on an inner circumferential side of the cylinder liner 21, that is, at a position close to the center axis C. In other words, the inner circumferential side end surface 21*q* is formed at a position closer to the center axis C than the flange portion 21*f*. The inner circumferential side end surface 21*q* is formed at a position protruding toward the cylinder head 30A side of the outer circumferential side end surface 21*p*. A stepped portion 21*r* extending in the cylinder axial direction is formed between the outer circumferential side end surface 21*p* and the inner circumferential side end surface 21*q*.

The cylinder head 30A includes an inner circumferential side opposing surface 31*q* and an outer circumferential side opposing surface 31*p* which face the inner circumferential side end surface 21*q* and the outer circumferential side end surface 21*p* of the cylinder liner 21, respectively. The inner circumferential side opposing surface 31*q* and the outer circumferential side opposing surface 31*p* are formed to be orthogonal to the center axis C. The inner circumferential side opposing surface 31*q* is formed on an outer circumferential side of the roof surface 31. The outer circumferential side opposing surface 31*p* is formed on an outer circumferential side of the inner circumferential side opposing surface 31*q*. The outer circumferential side opposing surface 31*p* is formed at a position protruding toward the cylinder liner 21 side of the inner circumferential side opposing surface 31*q*. A stepped portion 31*r* extending in the cylinder axial direction is formed between the inner circumferential side opposing surface 31*q* and the outer circumferential side opposing surface 31*p*. A height of the stepped portion 31*r* between the inner circumferential side opposing surface 31*q* and the outer circumferential side opposing surface 31*p* is smaller than a height of the stepped portion 21*r* between the outer circumferential side end surface 21*p* and the inner circumferential side end surface 21*q*.

A gasket (seal portion) 41A is provided between the cylinder liner 21 and the cylinder head 30A. The gasket 41A is disposed to surround an outer circumferential side of the opening 210 of the cylinder liner 21. More specifically, the gasket 41A is sandwiched between the outer circumferential side end surface 21*p* and the outer circumferential side opposing surface 31*p* to seal between the outer circumferential side end surface 21*p* of the cylinder liner 21 and the outer circumferential side opposing surface 31*p* of the cylinder head 30A. The gasket 41A is sandwiched between the cylinder head 30A and the cylinder block 20 together with the flange portion 21*f* by an axial force of a bolt (not shown) which fastens the cylinder head 30A and the cylinder block 20. Accordingly, the gasket 41A is slightly compressed and deformed and exhibits a high sealing property.

A slight gap S is formed between the inner circumferential side end surface 21*q* and the inner circumferential side opposing surface 31*q*. The gap S is set to a dimension in which the cylinder head 30A and the cylinder liner 21 do not come in direct contact when assembled with the gasket 41A interposed therebetween and is also set to a size of, for example, 1 mm or less which is a flame quenching distance.

The engine 10 includes a gap member 50 disposed in the gap S.

The gap member 50 is formed in a shape corresponding to a shape of the gap S. More specifically, the gap member 50 is formed in an annular shape continuing in a circumferential direction along the inner circumferential side end surface 21q of the cylinder liner 21 when seen in the cylinder axial direction. Further, the gap member 50 in the embodiment is formed in a solid belt shape (in other words, a sheet shape) having a thickness substantially equal to the gap S. The gap member 50 in the embodiment is formed to have the same thickness as the gap S in molding. However, the gap member 50 formed in this manner is disposed to be slightly crushed by the inner circumferential side opposing surface 31q and the inner circumferential side end surface 21q due to thermal expansion and bolt tightening.

The gap member 50 is formed of a material which is more flexible and has a lower Young's modulus than the cylinder head 30A, the cylinder liner 21, and the gasket 41A. The gap member 50 has sufficient heat resistance to withstand a temperature rise due to combustion of the premixed gas in the main combustion chamber 33. A ratio of the Young's modulus of the gasket 41A to the Young's modulus of the gap member 50 may be in a range of 1:0.001 to 1:0.7.

The material of the gap member 50 is selected according to a temperature in the main combustion chamber 33 and a flow of force to the cylinder liner 21.

When the temperature in the main combustion chamber 33 is 300° C. or less, the ratio of the Young's modulus of the gasket 41A to the Young's modulus of the gap member 50 may be in a range of 1:0.001 to 1:0.01. When the temperature in the main combustion chamber 33 is 300° C. or more, the ratio of the Young's modulus of the gasket 41A to the Young's modulus of the gap member 50 may be in a range of 1:0.01 to 1:0.7. When the temperature in the main combustion chamber 33 is 300° C. or less, a resin-based material having a low Young's modulus is selected as compared with the case in which the temperature is 300° C. or more. When the temperature in the main combustion chamber 33 is 300° C. or more, a metal-based material having a high Young's modulus is selected as compared with the case in which the temperature is 300° C. or less. Accordingly, the gap member 50 has sufficient heat resistance to withstand the temperature rise due to the combustion of the premixed gas and suppresses the fuel from entering the gap between the cylinder head 30A on the inner circumferential side of the gasket 41A and the cylinder liner 21. Furthermore, when the fuel is burned in the internal combustion engine, the fuel that has entered the gap is suppressed from remaining without being burned and suppresses lubricating oil from entering the gap and inducing abnormal combustion. In addition, a fastening force for fastening the cylinder body 20 and the cylinder head 30A can be applied mainly through the gasket 41A rather than via the gap member 50. Therefore, it is possible to suppress a shearing force from acting on the cylinder liner 21 by the fastening force and to reduce breakage of the cylinder liner 21.

For example, in the embodiment, the gasket 41A is a cold rolled steel plate (SPCC) material (Young's modulus: 205 [GPa]). The temperature rise of the gap member 50 due to the combustion of the premixed gas in the main combustion chamber 33 is, for example, 200° C.

In this case, the gap member 50 may be formed of, for example, a resin-based material such as PTFE (a polytetrafluoroethylene:tetrafluoroethylene resin, Young's modulus: 0.53 to 0.58 [GPa], maximum operating temperature: 260° C.), a metal-based material such as copper (Young's modulus: 130 [GPa], maximum operating temperature: 1000° C.), tin (Young's modulus: 50 [GPa], maximum operating temperature: 230° C.), or the like.

Besides that, PFA (a tetrafluoroethylene/perfluoroalkyl vinyl ether copolymer, Young's modulus: 0.54 to 0.64 [GPa], maximum operating temperature: 260° C.) may be used as the resin-based material for forming the gap member 50, and zinc (Young's modulus: 108), an aluminum alloy (Young's modulus: 69 to 76), lead (Young's modulus: 16.1) or the like may be used as the metal-based material.

According to the above-described engine 10 and the gap member 50 of the first embodiment, it is possible to suppress the fuel and the lubricating oil from entering the gap S by filling the gap S between the cylinder head 30A and the inner circumferential side end surface 21q of the cylinder liner 21 from the inner circumferential side of the gasket 41A with the gap member 50. Therefore, it is possible to suppress the fuel that has entered the gap S from remaining without being burned during the fuel combustion in the main combustion chamber 33 and to suppress the abnormal combustion from occurring due to the combustion of the lubricating oil that has entered the gap S. As a result, it is possible to improve fuel economy and low emission in the engine 10.

Here, since the engine 10 is a premixed combustion type, a mixed gas in which a fuel and air are mixed in advance is supplied to the main combustion chamber 33. In this case, the mixed gas easily enters the gap S between the cylinder head 30A and the cylinder liner 21. Therefore, it is possible to suppress the fuel contained in the mixed gas from entering the gap S by filling the gap S with the gap member 50. As a result, it is possible to efficiently improve the fuel economy and to achieve the low emission of the engine 10.

Further, the gap member 50 has a lower Young's modulus than the gasket 41A. Therefore, when a pressing force is applied by fastening the cylinder block 20 and the cylinder head 30A with a bolt or the like, a repulsive force generated in the gasket 41A can be made larger than a repulsive force generated in the gap member 50. Thus, the fastening force between the cylinder block 20 and the cylinder head 30A can be applied mainly to the cylinder block 20 via the gasket 41A rather than to the gap member 50. As a result, it is possible to suppress a shearing force from acting on the flange portion 21f of the cylinder liner 21 due to the above-described fastening force, thereby reducing the breakage of the cylinder liner 21.

Further, the gap member 50 is formed in an annular belt shape (sheet shape) having a shape corresponding to the gap S between the cylinder head 30A and the inner circumferential side end surface 21q of the cylinder liner 21. With such a constitution, it is only necessary to sandwich the preliminarily molded gap member 50 between the cylinder head 30A and the cylinder liner 21, and thus assembly efficiency of the engine 10 can be enhanced.

Second Embodiment

Next, a gap member and an internal combustion engine according to a second embodiment of the present invention will be described. In the second embodiment described below, since only the shape of the gap member is different from that of the first embodiment, the same reference numerals are given to the same parts as those of the first embodiment, and repeated description will be omitted.

Figure 3:
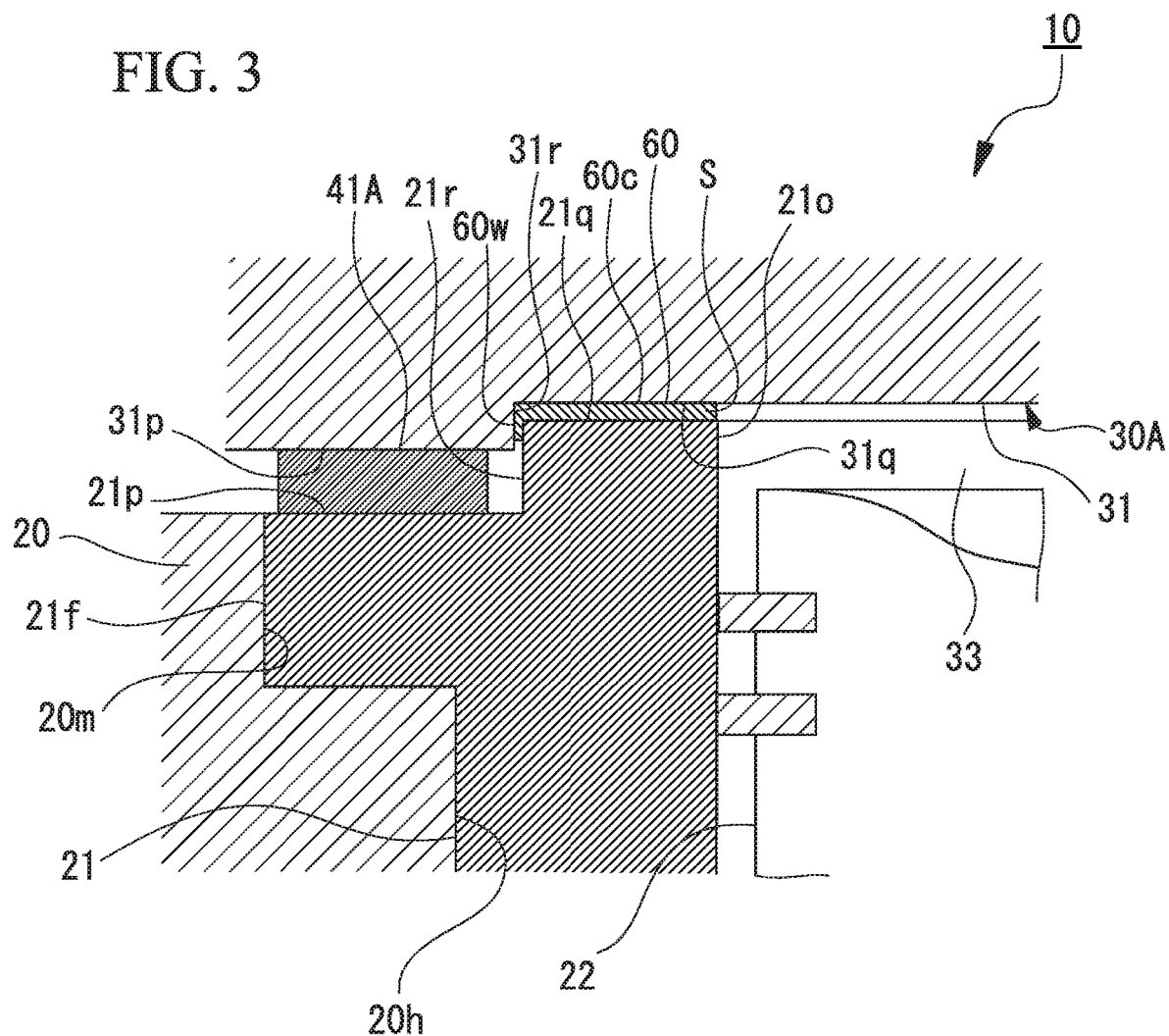
FIG. 3 is an enlarged cross-sectional view showing a joining structure of a cylinder block and a cylinder head of an internal combustion engine according to a second embodiment of the present invention.

FIG. 3 is an enlarged cross-sectional view showing a joining structure of a cylinder block and a cylinder head of an internal combustion engine according to the second embodiment of the present invention.

As shown in FIG. 3, an engine 10 in the embodiment includes a gap member 60 which fills a gap S between an inner circumferential side opposing surface 31q of a cylinder head 30A and an inner circumferential side end surface 21q of a cylinder liner 21.

The gap member 60 integrally includes a belt-shaped (in other words, sheet-shaped) annular portion 60c sandwiched between the inner circumferential side opposing surface 31q of the cylinder head 30A and the inner circumferential side end surface 21q of the cylinder liner 21, and a curved portion 60w integrally formed on an outer circumferential side of the annular portion 60c. The curved portion 60w is bent from an outer circumferential side end portion of the annular portion 60c along the inner circumferential side end surface 21q and extends along the stepped portion 21r. The gap member 60 of the embodiment is also solid, like the gap member 50 of the first embodiment.

Such a gap member 60 may be preliminarily molded into a shape integrally including the curved portion 60w on an outer circumferential side of the annular portion 60c.

According to the engine 10 and the gap member 60 of the second embodiment described above, since the gap member 60 is also disposed in a space between the stepped portion 21r and the stepped portion 31r, the space that the fuel enters can be reduced more than in the first embodiment. Therefore, it is possible to further suppress the fuel that has entered the gap S from remaining without being burned during the fuel combustion in the main combustion chamber 33. Furthermore, since the curved portion 60w is formed, positioning of the gap member 60 with respect to the gap S can be performed easily.

Further, the gap member 60 is formed in a shape corresponding to the gap S between the cylinder head 30A and the inner circumferential side end surface 21q of the cylinder liner 21. With such a configuration, the gap S can be filled more reliably. Furthermore, it is only necessary to sandwich the preliminarily molded gap member 60 between the cylinder head 30A and the cylinder liner 21, and thus the assembly efficiency of the engine 10 can be improved.

Modified Example of First and Second Embodiments

In the second embodiment, the cylinder head 30A has the stepped portion 31r between the inner circumferential side opposing surface 31q and the outer circumferential side opposing surface 31p. Further, the gasket 41A is sandwiched between the outer circumferential side end surface 21p of the cylinder liner 21 and the outer circumferential side opposing surface 31p of the cylinder head 30A from the outer circumferential side of the stepped portion 31r. However, the present invention is not limited to this constitution.

Figure 4:
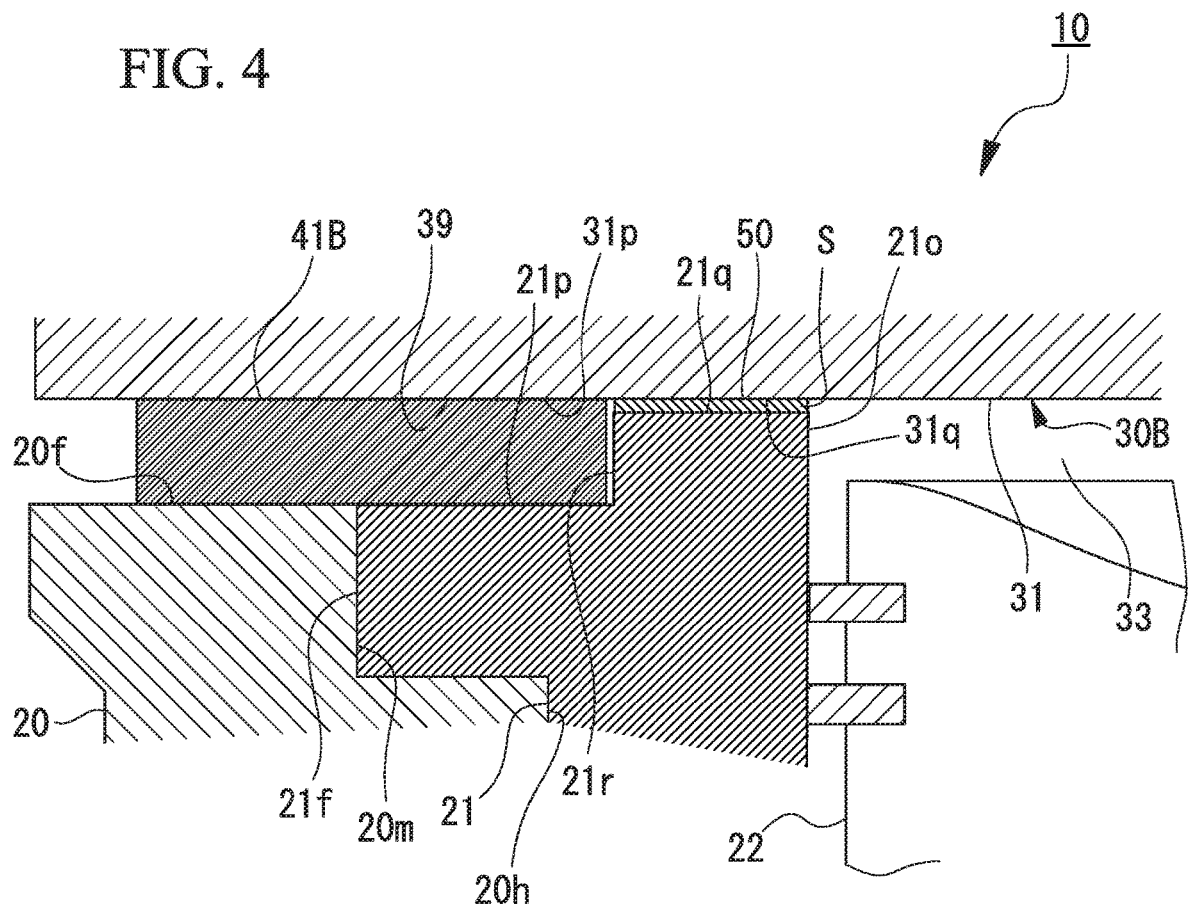
FIG. 4 is a cross-sectional view showing a configuration of a modified example of the internal combustion engine.

FIG. 4 is a cross-sectional view showing a constitution of a modified example of the internal combustion engine.

As shown in FIG. 4, in the cylinder head 30B, the outer circumferential side of the roof surface 31 may be a flat portion 39 having no step. The gasket 41B is sandwiched between the outer circumferential side end surface 21p of the cylinder liner 21 and the flat portion 39 of the cylinder head 30B. In this case, as shown in FIG. 4, the gasket 41B may extend to the head surface 20f of the cylinder block 20 further on the outer circumferential side than the outer circumferential side end surface 21p.

Other Modified Examples

The present invention is not limited to the above-described embodiments and includes various modified examples to the above-described embodiments within the scope not deviating from the gist of the present invention.

That is, the specific shapes and constitutions and so on described in the embodiments are merely examples and can be appropriately changed.

For example, the engine 10 may have any constitution. In the above-described embodiments, the case in which the engine 10 is a gas engine has been described, but the present invention can also be applied to engines using fuels other than gas.

Further, a stationary type gas engine used for power generation equipment and so on has been described as an example of the gas engine according to the above-described embodiments, but it is not limited to the stationary type gas engine.

Furthermore, although the premixed combustion type engine has been described as an example, the present invention can also be applied to a diffusion combustion type engine. When the present invention is applied to the premixed combustion type engine, it is advantageous because a greater effect can be obtained with respect to improvement in the fuel economy and achievement of the lower emission than in the diffusion combustion type engine.

Furthermore, in the above-described embodiments, the case in which the gaskets 41A and 41B are used as the seal portion has been described. However, it is not limited to the gaskets as long as it can seal by crushing. For example, the cylinder head 30A (30B) and the cylinder liner 21 may be brought into direct contact with each other to perform the sealing. In this case, the Young's modulus of the seal portion of the present invention may be lower than the Young's modulus of each of the cylinder head 30A (30B) and the cylinder liner 21.

Furthermore, in the above-described embodiments, the case in which the gap member 50 is formed by being cut out from the sheet-shaped material in an annular shape has been exemplified. However, the molding method of the gap member 50 is not limited to the above-described molding method as long as it can fill even a small amount of the gap S with the gap member 50.

INDUSTRIAL APPLICABILITY

The present invention can be applied to a gap member and an internal combustion engine. By applying the present invention to the gap member and the internal combustion engine, it is possible to further improve the fuel economy and to achieve low emission of the internal combustion engine and to suppress the breakage of the cylinder liner.

REFERENCE SIGNS LIST

10 Engine (internal combustion engine)
20 Cylinder block (cylinder body)
20f Head surface
20h Hole
20m Accommodating groove
21 Cylinder liner
21f Flange portion
21o Opening
21p Outer circumferential side end surface
21q Inner circumferential side end surface
21r Stepped portion
22 Piston
23 Connecting rod
24 Crankshaft
25 Pin
26 Pin
30A, 30B Cylinder head 31 Roof surface
31p Outer circumferential side opposing surface
31q Inner circumferential side opposing surface
31r Stepped portion
33 Main combustion chamber (combustion chamber)
34 Intake port
34a End portion
35 Exhaust port
35a End portion
36 Intake valve
37 Exhaust valve
39 Flat portion
40 Auxiliary chamber member
41A, 41B Gasket
50, 60 Gap member
60c Annular portion
60w Curved portion

The invention claimed is:

1. A gap member which is used in an internal combustion engine comprising:
   a cylindrical cylinder liner in which a piston reciprocates,
   a cylinder body on which the cylinder liner is fitted,
   a cylinder head provided to face the cylinder body and configured to close an opening of the cylinder liner, and
   a seal portion provided to surround an outer circumferential side of the opening and configured to seal between the cylinder head and at least one of the cylinder body and the cylinder liner,
   wherein the cylinder liner includes an outer circumferential side end surface and an inner circumferential side end surface which are formed to be orthogonal to a center axis of the cylinder liner,
   wherein the outer circumferential side end surface is formed to include a surface of a flange portion facing the cylinder head,
   wherein the inner circumferential side end surface is formed closer to the center axis of the cylinder liner than the flange portion, and is formed at a position projecting to the cylinder head side relative to the outer peripheral side end surface via a stepped portion,
   wherein the gap member is disposed in a gap between the cylinder head and the cylinder liner on an inner circumferential side of the seal portion,
   wherein the gap member is formed of any one of polytetrafluoroethylene and a tetrafluoroethylene/perfluoroalkyl vinyl ether copolymer which is a resin material having a lower Young's modulus lower than the seal portion, and
   wherein the gap member includes
   an annular portion sandwiched between the cylinder head and the inner circumferential side end surface, and
   a curved portion integrally formed on an outer circumferential side of the annular portion and which extends along the stepped portion from the outer circumferential side end portion of the annular portion, and
   wherein a space is formed between the seal portion and the gap member.

2. The gap member according to claim 1, wherein, in the internal combustion engine, a mixed gas in which fuel and air are mixed is supplied to a combustion chamber defined by being surrounded by the cylinder liner, the cylinder head, and the piston.

3. An internal combustion engine comprising:
   a cylinder liner in which a piston reciprocates,
   a cylinder body on which the cylinder liner is fitted,
   a cylinder head provided to face the cylinder body and configured to close an opening of the cylinder liner, and
   a seal portion provided to surround an outer circumferential side of the opening and configured to seal between the cylinder head and at least one of the cylinder body and the cylinder liner, and
   the gap member according to claim 1,
   wherein the gap member is sandwiched between the cylinder head and the cylinder liner to fasten the cylinder head and the cylinder body.

* * * * *